United States Patent
Hsu et al.

(10) Patent No.: US 7,637,645 B2
(45) Date of Patent: Dec. 29, 2009

(54) PRISM SHEET AND BACKLIGHT MODULE USING THE SAME

(75) Inventors: Tung-Ming Hsu, Taipei Hsien (TW); Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 199 days.

(21) Appl. No.: 11/957,500

(22) Filed: Dec. 17, 2007

(65) Prior Publication Data
US 2009/0080219 A1    Mar. 26, 2009

(30) Foreign Application Priority Data
Sep. 21, 2007    (CN)    ............ 2007 1 0201811

(51) Int. Cl.
*F21V 7/04* (2006.01)
(52) U.S. Cl. ............ 362/606; 362/626; 362/627; 362/333; 362/337; 359/599
(58) Field of Classification Search ............ 362/606, 362/617, 620, 626, 627, 333, 337
See application file for complete search history.

(56) References Cited

U.S. PATENT DOCUMENTS

| | | | |
|---|---|---|---|
| 3,721,818 A * | 3/1973 | Stahlhut | 362/297 |
| 6,964,497 B2 * | 11/2005 | Greiner | 362/241 |
| 7,121,709 B2 * | 10/2006 | Shinohara et al. | 362/606 |
| 2007/0171671 A1 * | 7/2007 | Kurokawa et al. | 362/606 |

* cited by examiner

*Primary Examiner*—Ali Alavi
(74) *Attorney, Agent, or Firm*—Frank R. Niranjan

(57) ABSTRACT

An exemplary prism sheet (20) includes a transparent main body. The main body includes a first surface (201), a second surface (202) opposite to the first surface, a plurality of first micro-depressions (203) defined in the first surface, and a plurality of second micro-depressions (204) defined in the second surface. Each of the first micro-depressions is conical frustum-shaped. Each of the first micro-depressions has four inner side surfaces connected to each other. A transverse width of each inner side surface of the first micro-depressions progressively decreases with increasing distance from its bottom surface that are coplanar with one of the first surface of the transparent main body. A backlight module (200) using the present prism sheet is also provided.

20 Claims, 9 Drawing Sheets

PRISM SHEET AND BACKLIGHT MODULE USING THE SAME

CROSS-REFERENCE TO RELATED APPLICATIONS

This application is related to seven co-pending U.S. patent applications, which are: application Ser. No. 11/933,439 and Ser. No. 11/933,441, filed on Nov. 1, 2007, and both entitled "PRISM SHEET AND LIQUID CRYSTAL DISPLAY DEVICE USING THE SAME"; applications Ser. No. 11/938,307 and Ser. No. 11/938,308, filed on Nov. 12, 2007, and both entitled "PRISM SHEET AND BACKLIGHT MODULE USING THE SAME"; application Ser. No. 11/940,328, filed on Nov. 15, 2007, and entitled "PRISM SHEET AND BACKLIGHT MODULE USING THE SAME", application Ser. No. 11/946,866 and Ser. No. 11/946,867, filed on Nov. 12, 2007, and both entitled "PRISM SHEET AND BACKLIGHT MODULE USING THE SAME", and application Ser. No. 11/949,058, Ser. No. 11/949,059, and Ser. No. 11/949,060, filed on Dec. 3, 2007, and all entitled "PRISM SHEET AND BACKLIGHT MODULE USING THE SAME". In the co-pending application, the inventors are Tung-Ming Hsu and Shao-Han Chang except application Ser. No. 11/933,439 and Ser. No. 11/933,441 which are invented by Shao-Han Chang. The co-pending application has the same assignee as the present application. The disclosure of the above identified application is incorporated herein by reference.

BACKGROUND OF THE INVENTION

1. Field of the Invention

The present invention relates to prisms, and particularly, to a prism sheet used in a backlight module.

2. Discussion of the Related Art

In a liquid crystal display device (LCD device), liquid crystal is a substance that does not itself illuminate light. Instead, the liquid crystal relies on light received from a light source, in order that the liquid crystal can provide displaying of information. In the case of a typical liquid crystal display device, a backlight module powered by electricity supplies the needed light.

FIG. 7 depicts a typical direct type backlight module 100. The backlight module 100 includes a housing 11, a plurality of lamps 12 above a base of the housing 11 for emitting light, and a light diffusion plate 13 and a prism sheet 10 stacked on top of the housing 11 in that order. Inner walls of the housing 11 are configured for reflecting light upwards. The light diffusion plate 13 includes a plurality of dispersion particles (not shown) therein. The dispersion particles are configured for scattering light, thus enhancing the uniformity of light exiting the light diffusion plate 13.

Referring to FIG. 8, the prism sheet 10 includes a base layer 101 (shown in FIG. 7) and a prism layer 102 formed on the base layer 101. The prism layer 102 contains a plurality of parallel prism lenses 103 having a triangular cross section. The prism lenses 103 are configured for collimating light to a certain extent. Typically, a method of manufacturing the prism sheet 10 includes following steps. First, an ultraviolet (UV)-cured transparent melted resin is coated on the base layer 101, and then the UV-cured transparent melted resin is solidified to form the prism lenses 103.

In use, unscattered light from the lamps 12 enters the light diffusion plate 13 and becomes scattered. The scattered light leaves the light diffusion plate 13 and enters the prism sheet 10. The scattered light then travels through the prism sheet 10 before being refracted out at the prism lenses 103 of the prism sheet 10. Thus, the refracted light leaving the prism sheet 10 is concentrated by the prism lenses 103 and increases the brightness (illumination) of the prism sheet 10. The refracted light then propagates into an LCD panel (not shown) disposed above the prism sheet 10.

When the light is scattered in the light diffusion plate 13, scattered light enters the prism sheet at different angles of incidence. Referring to FIG. 9, when scattered light enters the prism sheet 10 at different angles of incidence, the scattered light generally travels through the prism sheet 10 along three light paths. In the first light path (such as a1, a2) the light enters the prism sheet at small angles of incidence and refracts out of the prism lenses with the refracted path closer to the normal to the surface of the base layer. In the second light path (such as a3, a4) the light enters the prism sheet 10 at angles of incidence larger than the first light path and refracts out of the prism lenses 103 with the refracted path being closer to the normal to the surface of the prism lenses 103. Both the first light path and the second light path contribute to the brightness of the LED and the light utilization efficiency of the backlight module 100. However, in the case of the third light path (such as a5, a6), the light enters the prism sheets at angles greater than the second light path, such that when the refracted light in the third light path leaves the prism sheet 10 at the prism lenses 103 the refracted light impinges on the surface of adjacent prism lens 103 and reenters the prism sheet 10. Thus, light traveling along the third light path will eventually reenter the prism sheet 10 and may exit the prism sheet 10 on the same side the light entered. This third light path does not contribute to the light utilization efficiency of the backlight module 100. Further, the third light path may interfere with or inhibit other incident light resulting in decreasing brightness of the backlight module 100.

What is needed, therefore, is a new prism sheet and a backlight module using the prism sheet that can overcome the above-mentioned shortcomings.

SUMMARY

In one aspect, a prism sheet according to a preferred embodiment includes a transparent main body. The main body includes a first surface, a second surface opposite to the first surface, and a plurality of first micro-depressions defined in the first surface and a plurality of second micro-depressions defined in the second surface. Each of the first micro-depressions is conical frustum-shaped. Each of the second micro-depressions has four inner side surfaces connected to each other. A transverse width of each inner side surface of the second micro-depressions progressively decreases with increasing distance from the second surface.

In another aspect, a backlight module according to a preferred embodiment includes a plurality of lamps, a light diffusion plate and a prism sheet. The light diffusion plate is disposed above the lamps and the prism sheet is stacked on the light diffusion plate. The prism sheet is same as described in a previous paragraph.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present prism sheet and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present prism sheet and backlight module, in detail.

Figure 1:
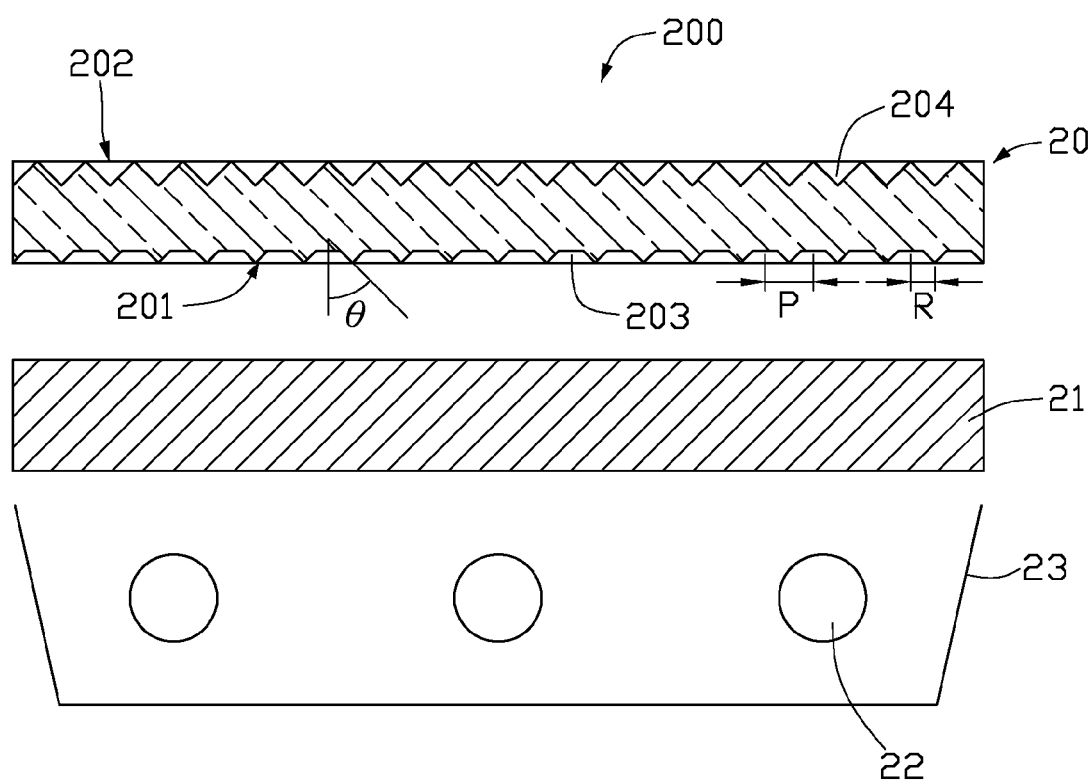
FIG. 1 is a side, cross-sectional view of a backlight module using a prism sheet according to a first preferred embodiment of the present invention.

Referring to FIG. 1, a backlight module 200 in accordance with a first preferred embodiment of the present invention is shown. The backlight module 200 includes a prism sheet 20, a light diffusion plate 21, a plurality of lamps 22, and a housing 23. The lamps 22 are regularly aligned above a base of the housing 23. The light diffusion plate 21 and the prism sheet 20 are stacked on the top of the housing 23 in that order.

Figure 2:
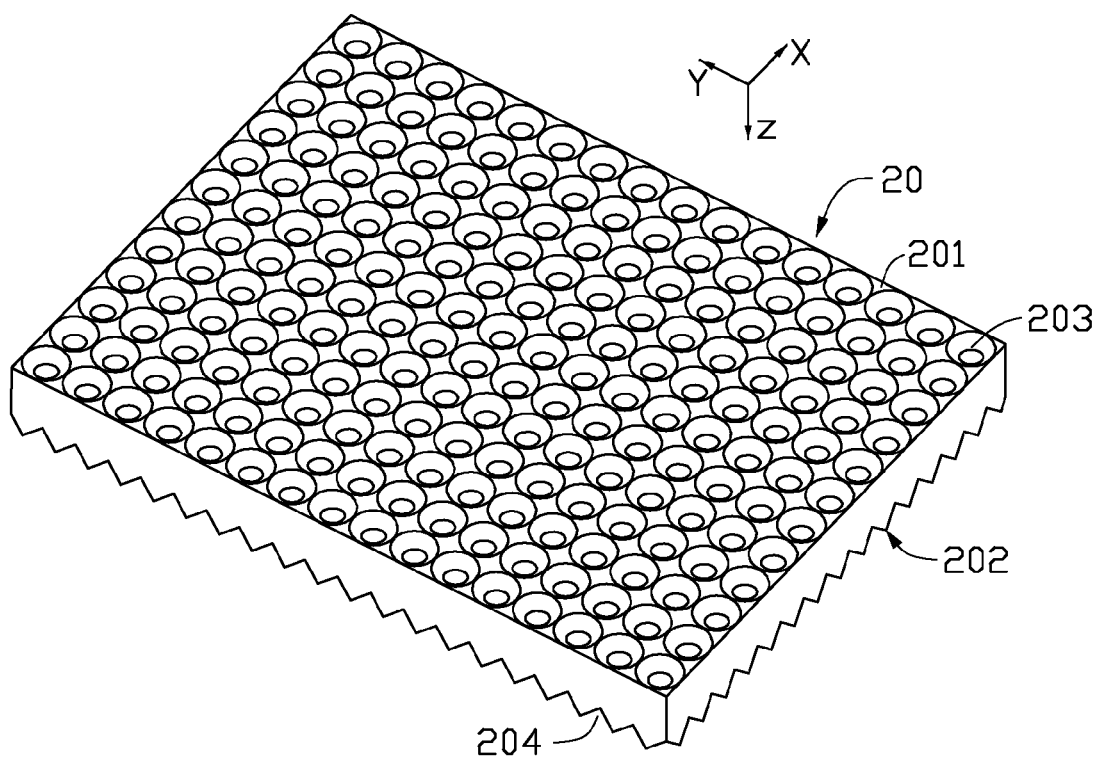
FIG. 2 is an isometric view of the prism sheet of FIG. 1.
Figure 3:
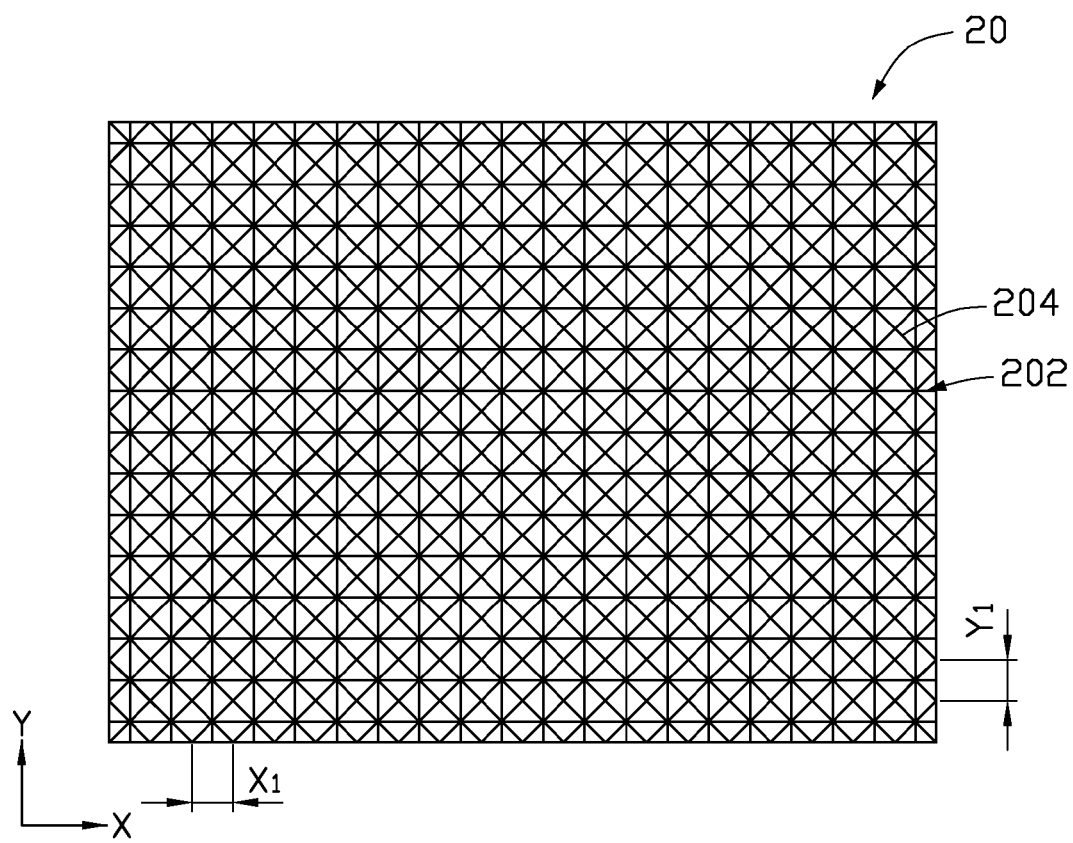
FIG. 3 is a top plan view of the prism sheet of FIG. 2.

Also referring to FIGS. 2 and 3, the prism sheet 20 includes a transparent main body. The main body includes a first surface 201, a second surface 202, a plurality of first micro-depressions 203, and a plurality of second micro-depressions 204. The first surface 201 and the second surface 202 are on opposite sides of the main body. The prism sheet 20 is stacked on the light diffusion plate 21 in a way such that the first surface 201 is adjacent to the light diffusion plate 21, and the second surface 202 faces away from the light diffusion plate 21. The first micro-depressions 203 are defined in the first surface 201 and the second micro-depressions 204 are defined in the second surface 202.

The first micro-depressions 203 are conical frustum-shaped. The first micro-depressions 203 are configured for converging incident light entering the prism sheet 20 from the lamps 22 to a certain extent (first light convergence). The first micro-depressions 203 are defined in the first surface 201 regularly, thus forming a regular matrix. A transverse width of each first micro-depression 203 increases along a direction from an inner end of the first micro-depression 203 to an outer end of the first micro-depression 203. Thus, a cross-section taken along an axis of symmetry of the first micro-depression 203 defines an isosceles trapezium. A pitch P between centers of adjacent first micro-depressions 203 is preferably in a range from about 0.025 mm to about 1.5 mm. A radius R of the outmost end of the first micro-depressions 203 is preferably in a range from about one quarter of the pitch P to about one pitch P. An angle θ defined by a slope of an inside surface of each first micro-depression 203 relative to a central axis of the first micro-depression 203 is preferably in a range from about 30 degrees to about 75 degrees. In this embodiment, the radius R of the outmost end of each first micro-depression 203 is half a pitch P. That is, each first micro-depression 203 is adjoining to adjacent first micro-depressions 203.

Each second micro-depression 204 is a square pyramidal depression forming four isosceles triangular inner side surfaces. A transverse width of each of the triangular inner side surfaces progressively decreases with increasing distance from the second surface 202. The second micro-depressions 204 are defined in the second surface 202 according to a second matrix manner corresponding to the first micro-depressions 203. The second micro-depressions 204 are configured for converging the received light emitted from the second surface 202. A pitch $X_1$ between centers of adjacent second micro-depressions 204 along the X-axis direction and a pitch $Y_1$ between centers of adjacent second micro-depressions 204 along the Y-axis direction are configured to be in the range from about 0.025 millimeters to about 1 millimeter. A dihedral angle θ, defined by sidewalls on opposite sides of each second micro-depression 204, is also configured to be in the range from about 60 degrees to about 120 degrees. The dihedral angle, defined by inner sidewalls on opposite sides may be the same as or different from the dihedral angle defined by inner sidewalls on other sides of each second micro-depression 204.

A thickness of the prism sheet 20 is preferably in the range from about 0.5 millimeters to about 3 millimeters. The prism sheet 20 can be made of transparent material selected from the group consisting of polycarbonate (PC), polymethyl methacrylate (PMMA), polystyrene (PS), copolymer of methylmethacrylate and styrene (MS), and any suitable combination thereof.

Again referring to FIG. 1, the lamps 22 can be point light sources such as light emitting diodes or linear light sources such as cold cathode fluorescent lamps. The housing 23 is made of metal or plastic materials with a high reflectivity rate. Alternatively, an interior of the housing 23 is preferably deposited with a high reflectivity coating for improving the light reflectivity rate of the housing 23. In this embodiment, the lamps 22 are cold cathode fluorescent lamps. The housing 23 is made of metal having a high reflectivity rate.

In the backlight module 200, when the light enters the prism sheet 20 via the first surface 201, the light is converged on a certain extent by the first micro-depressions 203 of the first surface 201. Most of the light rays are further substantially converged by the second micro-depressions 204 of the second surface 202 before they exit the prism sheet 20. Therefore, a brightness of the backlight module 200 is increased. In addition, due to the micro-depressions 203, most of the light would propagate along directions close to the Y-direction. At the same time, less light would travel along directions close to the X-direction, minimizing the light energy loss. Accordingly, the light energy utilization rate of the backlight module 200 is high.

Furthermore, because the first and second surfaces 201, 202 form depressions having sidewalls expanding out of the prism sheet 20 at an angle, the light receiving area of the sheet is increased and the angles that the light refracts out (allowing the light to exit) of the prism sheet 20 is expanded. Additionally, the slope of the sidewalls of micro-depressions 203 and 204 also the obliqueness relative to the edge of the prism sheet 20 can have various configurations according to predetermined viewing angles requirements of the backlight module 200. The prism sheet 20 can also be orientated to obtain appropriate viewing angle relative the latitudinal (X-direction) and longitudinal (Y-direction) directions of the backlight module 200. It could solve the problem that conventional prism sheets fail to satisfy most of the LCD displays' requirements on horizontal and vertical viewing angles.

Moreover, in contrast to the conventional prism sheet, the prism sheet 20 of the present invention is integrally formed by injection molding technology. Injection molding allows the prism sheet 20 to be easier to mass-produce than the conventional method. Furthermore, because the prism lenses of the conventional prism sheet is manufactured by solidifying ultraviolet-cured transparent melted resin whereas the prism sheet 20 is manufactured by injection molding. The prism lenses are usually damaged or scratched due to poor rigidity, mechanical strength, and abrasive properties of the prism lenses. However, the prism sheet 20 of the present invention has better rigidity, mechanical strength, and abrasive properties than the conventional prism sheet. Therefore, the present prism sheet 20 is not easily damaged or scratched.

It should be noted that, the second micro-depressions 204 are configured to be different from the first micro-depressions 203, the first micro-depressions 203 or the second micro-depressions 204 are aligned obliquely with the LCD pixels either in the X-direction or the Y-direction. Accordingly, moire pattern interference effect between the prism sheet 20 with the pixel pitch of LCD panel can be decreased or even eliminated.

Figure 4:
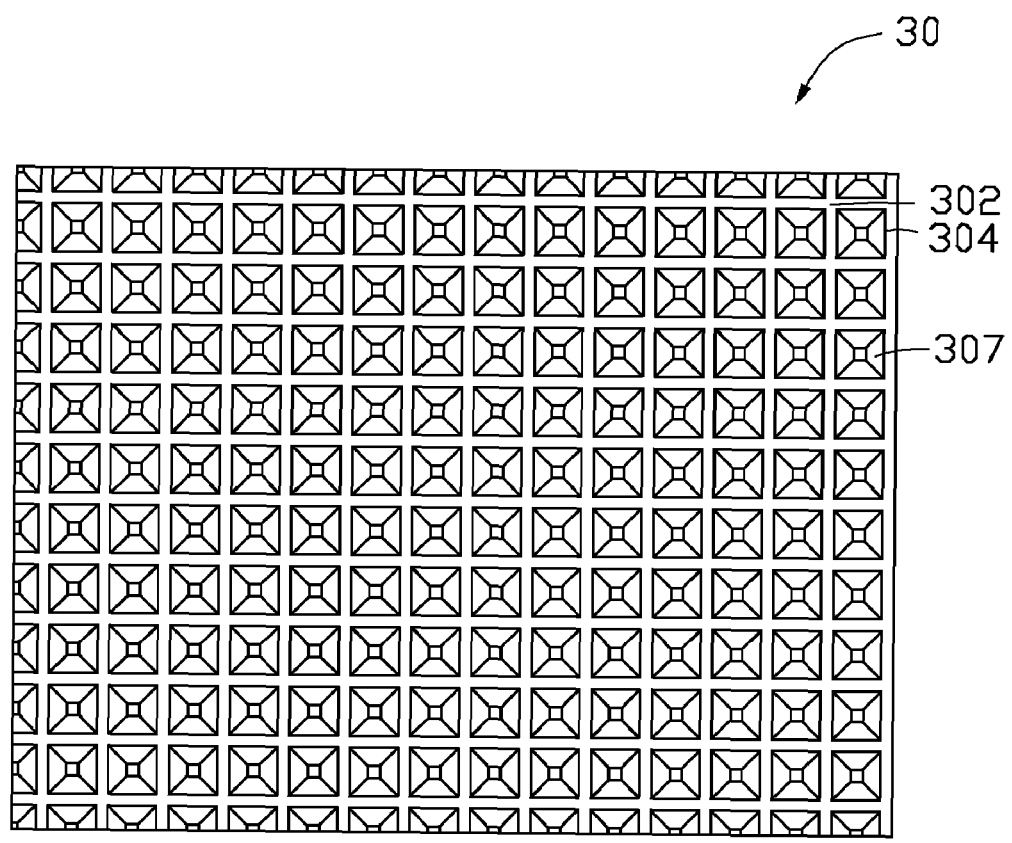
FIG. 4 is a top plan view of a prism sheet according to a second preferred embodiment of the present invention.

Referring to FIG. 4, a prism sheet 30 in accordance with a second preferred embodiment of the present invention is shown. The prism sheet 30 is similar in principle to the prism sheet 20, except that each of second micro-depressions 304 of second surface 302 is a frusto-pyramidal groove, and includes four inner sidewalls 307. Each of the inner sidewalls 307 of the second micro-depressions 303 is an isosceles trapezium. The second micro-depressions 304 are spaced from each other.

Figure 5:
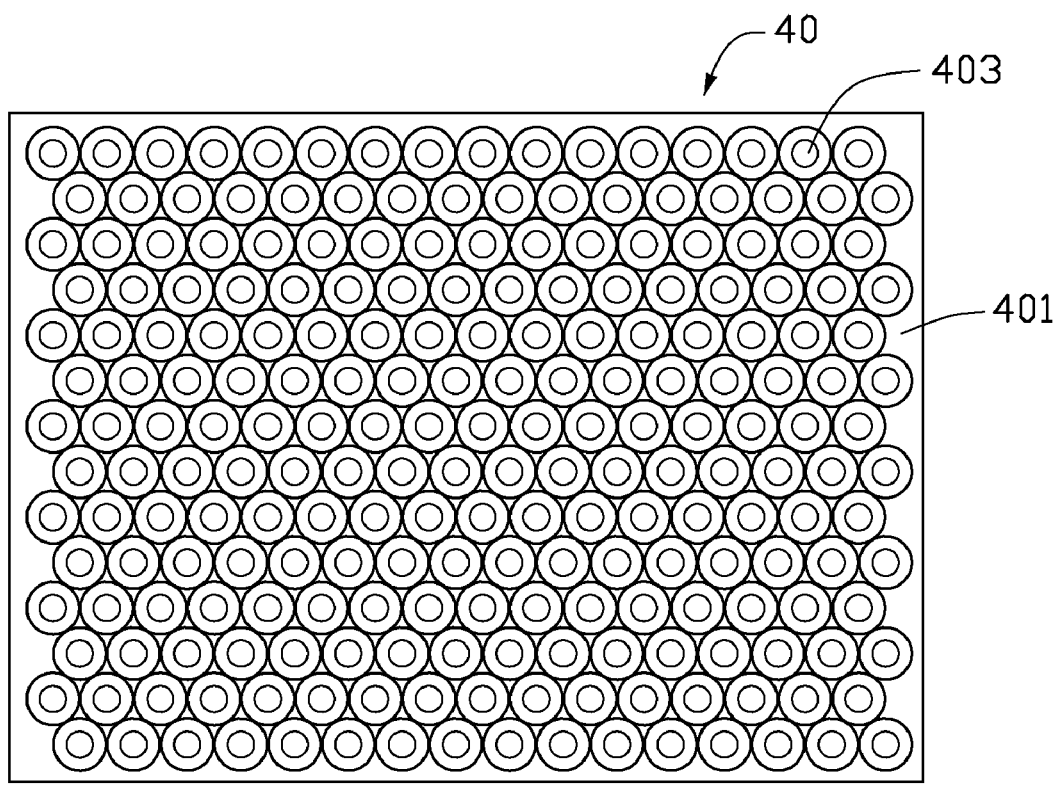
FIG. 5 is a bottom plan view of a prism sheet according to a third preferred embodiment of the present invention.

Referring to FIG. 5, a prism sheet 40 in accordance with a third preferred embodiment of the present invention is shown. The prism sheet 40 is similar in principle to the prism sheet 20. The prism sheet 40 includes a first surface 401 and a plurality of first micro-depressions 403 defined at the first surface 401. However, the first micro-depressions 403 are arranged in staggered rows and the staggered rows are arranged so that they abut each other. Thus a honeycomb pattern of the first micro-depressions 403 is formed. Each first micro-depressions 403 abuts the adjacent first micro-depressions 403 in each adjacent row.

Figure 6:
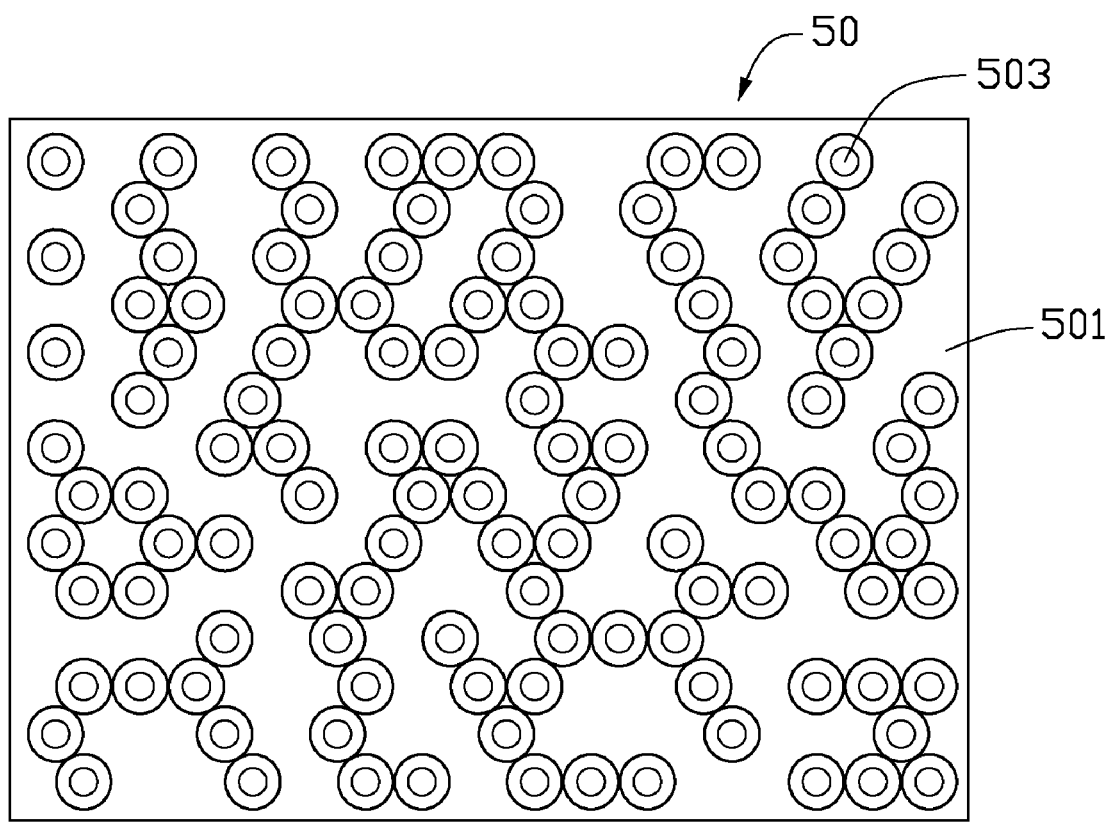
FIG. 6 is a bottom plan view of a prism sheet according to a fourth preferred embodiment of the present invention.
Figure 7:
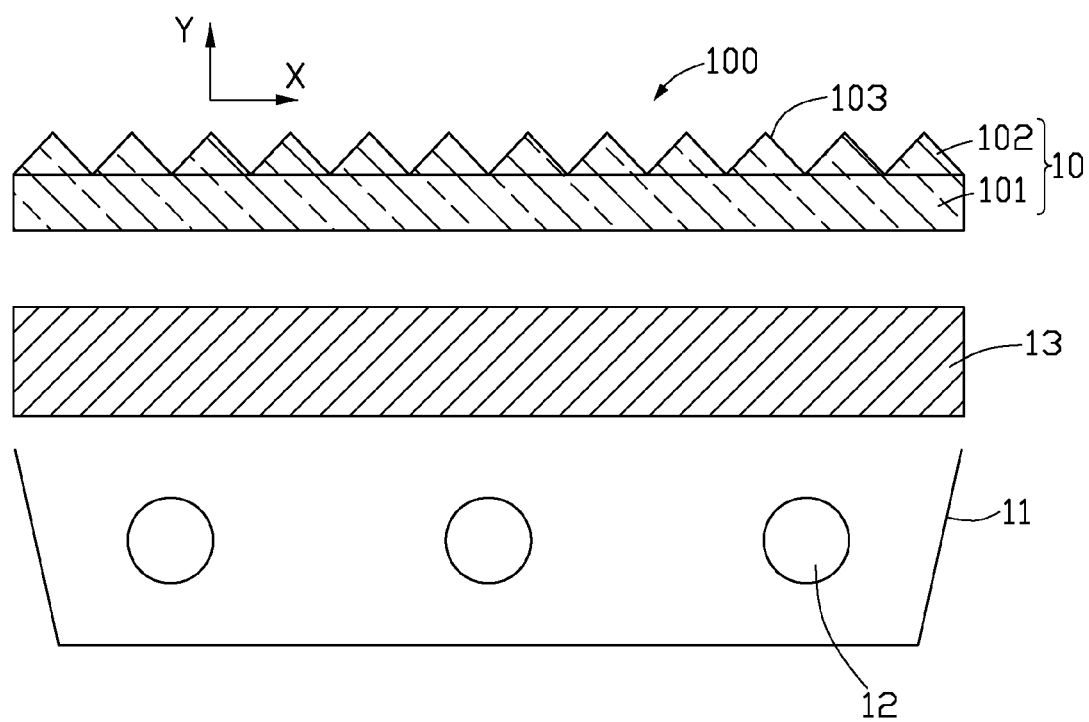
FIG. 7 is a side cross-sectional view of a conventional backlight module employing a typical prism sheet.
Figure 8:
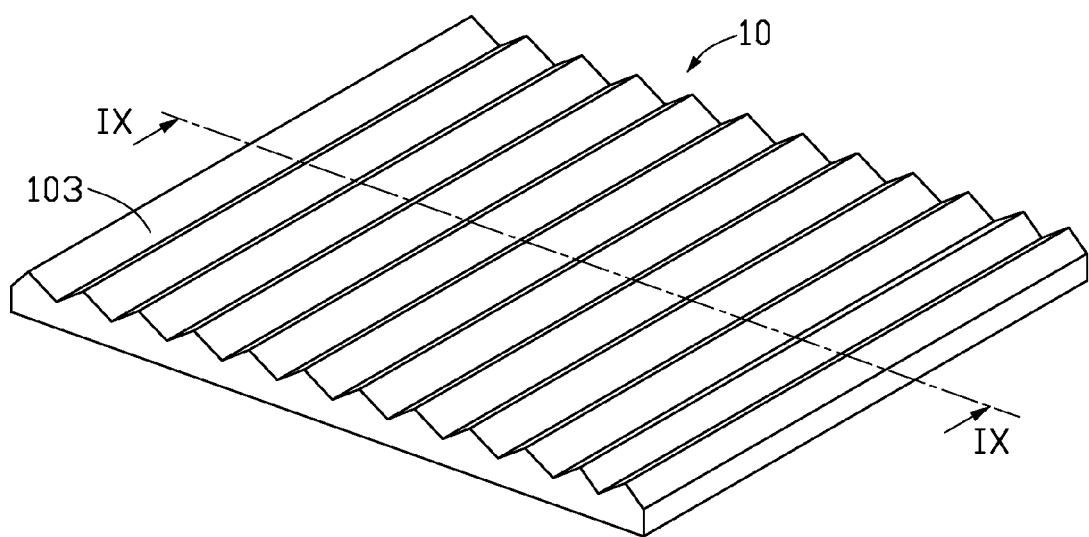
FIG. 8 is an isometric view of the prism sheet shown in FIG. 7.
Figure 9:
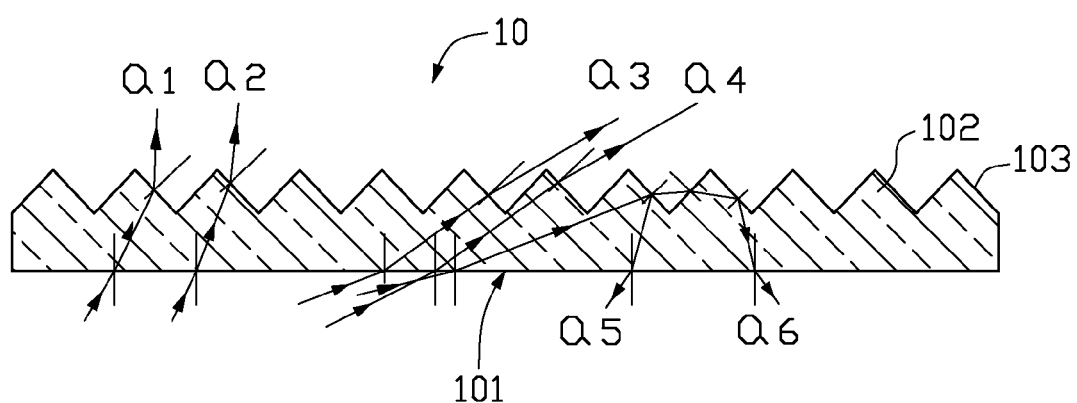
FIG. 9 is side, cross-sectional view of the prism sheet of FIG. 7, taken along line VIII-VIII, showing light transmission paths.

Referring to FIG. 6, an prism sheet 50 according to a fourth embodiment is shown. The prism sheet 50 is similar in principle to the prism sheet 20. The prism sheet 50 includes a first surface 501 and a plurality of first micro-depressions 503 defined at the first surface 501. However, the first micro-depressions 503 are arranged randomly.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A prism sheet comprising:
  a transparent main body having:
  a first surface,
  a second surface opposite to the first surface, and
  a plurality of first micro-depressions formed in the first surface and a plurality of second micro-depressions defined in the second surface, wherein each of the first micro-depressions is conical frustum-shaped, and each of the second micro-depressions has four inner side surfaces connected to each other, and a transverse width of each inner side surface of the second micro-depressions progressively decreases with increasing distance from the second surface.

2. The prism sheet according to claim 1, wherein the first micro-depressions are regularly defined at the first surface, thus forming a regular matrix, a transverse width of each first micro-depression increases along a direction from an inmost end of the first micro-depression to an outmost end of the first micro-depression.

3. The prism sheet according to claim 2, wherein a pitch between centers of adjacent first micro-depressions is in the range from about 0.025 mm to about 1.5 mm, a radius of an outermost end of each of the first micro-depressions is in the range from about one quarter of the pitch to about one pitch, and an angle defined by an inside surface of each first micro-depression relative to a central axis of the first micro-depression is in the range from about 30 degrees to about 75 degrees.

4. The prism sheet according to claim 2, wherein a radius of an outermost end of each first micro-depression is half of one pitch between centers of adjacent first micro-depressions.

5. The prism sheet according to claim 1, wherein the first micro-depressions are arranged in staggered rows and the staggered rows are arranged so that they abut each other.

6. The prism sheet according to claim 1, wherein the first micro-depressions are arranged randomly.

7. The prism sheet according to claim 1, wherein the second micro-depressions are selected from a group consisting of rectangular pyramidal groove and frusto-pyramidal depression.

8. The prism sheet according to claim 2, wherein the second micro-depressions are defined in the second surface according to the first micro-depressions.

9. The prism sheet according to claim 1, wherein a dihedral angle defined by opposite side surfaces of each of the second micro-depressions is configured to be in a range from about 60 degrees to about 120 degrees.

10. The prism sheet according to claim 9, wherein a pitch between centers of adjacent second micro-depressions along a first direction and a pitch between centers of adjacent second micro-depressions along a second direction perpendicular to the first direction are configured to be in the range from about 0.025 millimeters to about 1 millimeter.

11. The prism sheet according to claim 1, wherein a thickness of the prism sheet is in a range from about 0.5 millimeters to about 3 millimeters.

12. The prism sheet according to claim 1, wherein the prism sheet is made of transparent material selected from the group consisting of polycarbonate, polymethyl methacrylate, polystyrene, copolymer of methylmethacrylate and styrene, and any combination thereof.

13. The prism sheet according to claim 1, wherein each of second micro-depressions of second surface is a frusto-pyramidal groove, and includes four inner side surfaces, each of the inner side surfaces of the second micro-depressions is an isosceles trapezium, and the second micro-depressions are spaced from each other.

14. A backlight module comprising:
  a plurality of lamps;
  a light diffusion plate disposed above the lamps; and
  a prism sheet disposed on the light diffusion plate, the prism sheet includes a transparent main body having:
  a first surface,
  a second surface opposite to the first surface, and a plurality of first micro-depressions defined in the first surface and a plurality of second micro-depressions defined in the second surface, wherein each of the first micro-depressions is conical frustum-shaped, and each of the second micro-depressions has four inner side surfaces connected to each other, a transverse width of each inner side surface of the second micro-depressions progressively decreases with increasing distance from the second surface.

15. The backlight module according to claim 14, wherein the first micro-depressions are regularly defined at the first surface, thus forming a regular matrix, a transverse width of each first micro-depression increases along a direction from an inmost end of the first micro-depression to an outmost end of the first micro-depression.

16. The backlight module according to claim 15, wherein a pitch between centers of adjacent first micro-depressions is in the range from about 0.025 mm to about 1.5 mm, a radius of an outermost end of each of the first micro-depressions is in the range from about one quarter of the pitch to about one pitch, and an angle defined by an inside surface of each first micro-depression relative to a central axis of the first micro-depression is in a range from about 30 degrees to about 75 degrees.

17. The backlight module according to claim 14, wherein the second micro-depressions are selected from a group consisting of rectangular pyramidal depression and frusto-pyramidal depression.

18. The backlight module according to claim 14, wherein a dihedral angle defined by opposite side surfaces of each of the second micro-depressions is configured to be in a range from about 60 degrees to about 120 degrees, a pitch between centers of adjacent second micro-depressions along a first direction and a pitch between centers of adjacent second micro-depressions along a second direction perpendicular to the first direction are configured to be in the range from about 0.025 millimeters to about 1 millimeter.

19. The backlight module according to claim 14, wherein a thickness of the prism sheet is in a range from about 0.5 millimeters to about 3 millimeters.

20. The backlight module according to claim 14, wherein the prism sheet is made of transparent material selected from the group consisting of polycarbonate, polymethyl methacrylate, polystyrene, copolymer of methylmethacrylate and styrene, and any combination thereof.

* * * * *